(12) United States Patent
Smith et al.

(10) Patent No.: US 7,552,901 B2
(45) Date of Patent: Jun. 30, 2009

(54) RAPID EXCHANGE SYSTEM FOR TESTING WIRELESS NETWORKS

(75) Inventors: Steven L. Smith, Buford, GA (US);
Chris R. Radosta, Cumming, GA (US);
Mark Horton, Suwanee, GA (US);
Daniel Silvernale, Roswell, GA (US);
Christopher T. Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 514 days.

(21) Appl. No.: 11/218,943

(22) Filed: Sep. 2, 2005

(65) Prior Publication Data

US 2006/0049321 A1    Mar. 9, 2006

Related U.S. Application Data

(60) Provisional application No. 60/607,472, filed on Sep. 2, 2004.

(51) Int. Cl.
*F16M 13/00* (2006.01)
*A47F 5/08* (2006.01)

(52) U.S. Cl. ............... 248/618; 211/94.01; 248/231.81; 248/638

(58) Field of Classification Search ................ 248/27.3, 248/221.11, 220.221, 220.22, 562, 615, 618, 248/638, 220.41, 220.42, 316.1, 231.81; 211/87.01, 94.01
See application file for complete search history.

(56) References Cited

U.S. PATENT DOCUMENTS

| | | | |
|---|---|---|---|
| 3,822,049 A | 7/1974 | Saunders | |
| 4,113,217 A | 9/1978 | O'Connell | |
| 4,589,557 A | 5/1986 | Bollmann | |
| 4,714,303 A | 12/1987 | Suzuki et al. | |

(Continued)

FOREIGN PATENT DOCUMENTS

EP    0 673 804 A1    3/1995

(Continued)

OTHER PUBLICATIONS

International Search Report and Written Opinion dated Jan. 17, 2006 for PCT/US2004/031618 filed Sep. 24, 2004.

(Continued)

*Primary Examiner*—Amy J. Sterling
*Assistant Examiner*—Tan Le
(74) *Attorney, Agent, or Firm*—Alston & Bird LLP (57) ABSTRACT

In one embodiment of the invention, the mounting assembly includes a channel plate and a bracket for securely receiving the signal testing unit. The channel plate is securely mounted adjacent to a surface of a vehicle and includes a plurality of channels that extend through the plate. The bracket includes a housing for receiving the testing unit and one or more clips. Each clip engages a channel in the channel plate to mount the bracket to the channel plate. In addition, each clip includes at least one finger that includes an engaging portion. The clip is removably engaged into one of the channels by positioning the engaging portion of each finger adjacent the back side of the channel plate such that the bracket is positioned adjacent the front side of the channel plate. In one embodiment, the finger is spring biased.

8 Claims, 7 Drawing Sheets

U.S. PATENT DOCUMENTS

| | | | |
|---|---|---|---|
| 4,977,399 | A | 12/1990 | Price et al. |
| 5,007,608 | A | 4/1991 | Carroll, Jr. |
| 5,031,074 | A | 7/1991 | Ravid |
| 5,095,500 | A | 3/1992 | Tayloe et al. |
| 5,193,890 | A | 3/1993 | Robertson, Jr. et al. |
| 5,398,276 | A | 3/1995 | Lemke et al. |
| 5,481,588 | A | 1/1996 | Rickli et al. |
| 5,561,839 | A | 10/1996 | Österberg et al. |
| 5,599,080 | A | 2/1997 | Ho |
| 5,752,164 | A | 5/1998 | Jones |
| 5,946,612 | A | 8/1999 | Johansson |
| 5,987,306 | A | 11/1999 | Nilsen et al. |
| 5,991,622 | A | 11/1999 | Henry, Jr. |
| 6,199,706 | B1 * | 3/2001 | Shea ............... 211/87.01 |
| 6,205,719 | B1 * | 3/2001 | Bruce ............... 52/147 |
| 6,272,337 | B1 | 8/2001 | Mount et al. |
| 6,315,255 | B1 | 11/2001 | Chan et al. |
| 6,377,445 | B1 | 4/2002 | Davis et al. |
| 6,400,690 | B1 | 6/2002 | Liu et al. |
| 6,402,111 | B1 | 6/2002 | Stewart et al. |
| 6,449,485 | B1 | 9/2002 | Anzil |
| 6,578,498 | B1 * | 6/2003 | Draudt et al. ............ 108/50.02 |
| 6,603,966 | B1 | 8/2003 | Sheffield |
| 6,702,604 | B1 | 3/2004 | Moscovitch |
| 6,719,258 | B2 * | 4/2004 | Bryngelson et al. ......... 248/419 |
| 6,811,043 | B2 * | 11/2004 | Perkins et al. ........... 211/94.01 |
| 7,093,814 | B2 * | 8/2006 | Meisel et al. ............. 248/562 |
| 7,510,163 | B2 * | 3/2009 | Schlitzkus et al. .......... 248/635 |
| 2001/0004157 | A1 | 6/2001 | Lance et al. |
| 2002/0029108 | A1 | 3/2002 | Liu et al. |
| 2003/0014286 | A1 | 1/2003 | Cappellini |
| 2004/0074169 | A1 * | 4/2004 | Renke et al. ............... 52/213 |
| 2006/0049321 | A1 * | 3/2006 | Smith et al. ............. 248/220.31 |

FOREIGN PATENT DOCUMENTS

| | | |
|---|---|---|
| EP | 0 977 450 A2 | 2/2000 |
| FR | 2 725 311 A1 | 9/1994 |
| FR | 2 721 363 A1 | 6/1995 |
| JP | 06060229 | 9/1995 |

OTHER PUBLICATIONS

TEMS™ Automatic WCDMA Take Control of Your Mobile Internet Quality of Service, Copyright 2001, pp. 1-2, (available at http:\\www.ericsson.com/services/tems/downloads/ds_automatic_wcdma.pdf), *Publication AE/LZT 123 6694, R1.*

TEMS™ Drive Tester CDMA An Innovative Drive Test Solution, Copyright 2003, pp. 1-4, (available at http:\\www.ericsson.com/serivce/internet/picov/get?DocNo=28701-FAP9010100), *Publication AE/LZT 123 7307, R3.*

TEMS™ Automatic WCDMA Take Control of Your Mobile Internet Quality of Service, Copyright 2001, pp. 1-2, www.ericsson.com, *Publication AE/LZT 123 6694 R1.*

TEMS™ Drive Tester CDMA An Innovative Drive Test Solution, (Copyright 2003), pp. 1-4, www.ericsson.com/tems, *Publication AE/LZT 123 7307, R3.*

Lisa Sigler, Assess Speech Quality with PESQ, now in TEMS™ Automatic, date unknown, p. 1 of 1.

TEMS™ Automatic Streamlined Operations And Improved QoS GSM/GPRS, CDMA, and TDMA, Copyright 2004, pp. 1-4, www.ericsson.com/tems, *Publication 287 01-FAP 901 0409 B.*

Ericsson, TEMS™—Making Wireless Better, APAC Workshop, Sep. 2004, pp. 1-17.

TechNotes: Tools for Precision-A Tool Kit to Optimize WCDMA Networks, date unknown; p. 1 of 1 numbered p. 46, www.ericsson.com/tems.

Lisa Sigler, TEMS™ News, An Ericsson Newsletter, Jun. 2003 No. 2, pp. 1-8.

TEMS™ News, An Ericsson Newsletter, Q2 2004 No. 2 pp. 1-8.

TEMS™ News, An Ericsson Newsletter, Q3 2004, No. 3, pp. 1-8.

On The New World of Communication Magazine, Mar. 2002, pp. 1-50.

TEMS™ Drive Tester http://www.ericsson.com/services/tems/cdma/drivetester-cdma.shtml 1 Page, Published Jun. 24, 2004.

"TEMS™ DriveTester" http://www.ericsson.com/services/tems/downloads/ds_drivetester.pdf 2 Pages, Published 2002.

TEMS™ Tech Support: TEMS Automatic GSM Take Control Of Your Mobile Internet Quality Of Service, date unknown, pp. 1-3 www.ericsson.com/services/tems/support/sup_automatic_gsm.shtml.

TEMS™ Automatic Making Wireless Better Take Control Of Your Mobile Internet Quality Of Service, date unknown, pp. 1-2, www.ericsson.com/services/tems/cdma/automatic-cdma.shtml.

TEMS™ Tech Support: TEMS Drivetester CDMA Making Wireless Better: Instantly Isolate Network Trouble Spots, date unknown, pp. 1-2 www.ericsson.com/services/tems/support/drivetester/sup_drivetester_cdma.shtml.

TEMS™ Tech Support: TEMS Drivetester GSM/TDMA Making Wireless Better Instantly Isolate Network Trouble Spots, date unknown, pp. 1-2, www.ericsson.com/services/tems/support/drivetester/sup_drivetester_gsnm_tdma.shtml.

TEMS™ Tech Support: TEMS Linkplanner Making Wireless Better, FAQ's, date unknown, pp. 1-2, www.ericsson.com/services/tems/support/linkplanner/sup_linkplanner_faq_import.shtml.

TEMS™ Tech Support: TEMS Linkplanner Making Wireless Better FAQ's, Map Data, date unknown, p. 1 of 1. www.ericsson.com/services/tems/support/linkplanner/sup_linkplanner_faq_mapdata.shtml.

TEMS™ Tech Support TEMS Linkplanner: Making Wireless Better FAQ's, General, date unknown, p. 1 of 1, www.ericsson.com/services/tems/support/linkplanner/sup_linkplanner_faq_general.shtml.

TEMS™ Drivetester CMDA2000 2.0 An Innovative Drive Test Slution for CDMA Networks, date unknown, p. 1 of 1, www.ericsson.com/products/TEMSdrivetesterCDMA200020pos.shtml.

TEMS™ Drive Tester CDMA An Innovative Drive Test Solution, Copyright 2005, pp. 1-4, www.ericsson.com/tems, *Publication 287 01-FAP 901 0539 Uen.*

International Search Report for PCT/US2004/031618 filed Sep. 24, 2004.

International Search Report and Written Opinion dated Dec. 21, 2005 for PCT/US2005/031614 filed Feb. 9, 2005.

Second Written Opinion for PCT/US2004/031618 filed Sep. 24, 2004.

* cited by examiner

RAPID EXCHANGE SYSTEM FOR TESTING WIRELESS NETWORKS

CROSS REFERENCE TO RELATED APPLICATIONS

This application claims priority from provisional U.S. Patent Application No. 60/607,472, entitled, "Mounting Bracket," which was filed Sep. 2, 2004, and which is incorporated herein by reference.

BACKGROUND OF INVENTION

Signal network operators frequently use signal testing units to measure and improve signal coverage in a geographical area, such as radio, television, or other wireless signal coverage. The signal testing units are positioned in the coverage area and collect geographical position data and various radio communication related parameters, such as signal strength. This information is analyzed to troubleshoot and improve the coverage of wireless signal networks. Currently, signal network operators drive the signal testing units around a geographical area to collect data. Typically, the signal testing unit is placed in a vehicle in an unsecured manner or is semi-permanently mounted to the vehicle. When the signal testing unit is unsecured, it can be easily transferred from one vehicle to another, but the signal testing unit can be easily damaged, stolen, or interfere with operation of the vehicle. If the signal testing unit is semi-permanently mounted to the vehicle, then the unit cannot be easily transferred, and time and special tools may be required to remove and install the unit.

Multiple vehicles may be used to collect data in various locations. One option is to install the signal testing unit in each vehicle, but such an approach can be costly.

Further, when a signal testing unit is transferred to another vehicle, antenna and power connections may be required. The signal testing unit may require connection to a GPS antenna that is external to the testing unit for determining the unit's location as well as signal antenna(s) for collecting and reporting the signal data. Additionally, connection to the vehicle's power system may be required. Completing these connections may further complicate transferring a signal testing unit from one vehicle to another if the installation is not compatible with the design of the signal testing unit.

Therefore, there is a need for an apparatus that provides easy removal of a signal testing unit from one vehicle and installation in another, so as to facilitate the use of signal testing units in different vehicles at different times, for monitoring a signal network.

BRIEF SUMMARY OF THE INVENTION

This invention is related to a mounting assembly for mounting a signal network testing unit. Such a mounting assembly is useful for mounting testing units that are used to collect signal strength data of communication networks into or onto vehicles. More than one testing unit may be deployed in a vehicle fleet, and these testing units may be moved from one vehicle to another. Furthermore, the mounting assembly can accommodate testing units having different sizes. In some embodiments of the invention, the mounting assembly protects testing units from damage by other objects within the vehicle and from the vibrations of the vehicle and provides an external antenna when an antenna is needed by the testing unit.

In one embodiment of the invention, the mounting assembly includes a channel plate and a bracket for securely receiving the signal testing unit. The channel plate is securely mounted adjacent to a surface of a vehicle and includes a plurality of channels that extend through the plate. The bracket includes a housing that receives the signal testing unit and one or more clips that extend from the housing. Each clip engages a channel in the channel plate to mount the bracket to the channel plate. In addition, each clip includes at least one finger, and each finger has an engaging portion. The clip is removably engaged into one of the channels by positioning the engaging portion of each finger adjacent the back side of the channel plate such that the housing is positioned adjacent the front side of the channel plate. In a further embodiment, the clip is spring biased, allowing the testing unit to be mounted adjacent to a vehicle surface without the use of a tool.

DETAILED DESCRIPTION OF THE INVENTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Generally the embodiments of mounting assemblies disclosed below provide for a channel plate mounted to a vehicle surface and a bracket that securely holds a signal testing unit and includes one or more clips to removably mount the bracket to the channel plate. In particular, the bracket further includes one or more clips, and each clip engages a channel on the channel plate to mount the bracket to the channel plate. Furthermore, by having a plurality of channels on the channel plate, the operator can mount brackets having various dimensions or having clips positioned at various places on the brackets. Thus, a common mounting assembly that facilitates the movement of the testing unit and bracket between vehicles is provided. Optionally, an electrical connection and GPS or wireless signal antennas are provided with the mounting assembly for secure installation and operation of the unit.

Figures 1, 1A:
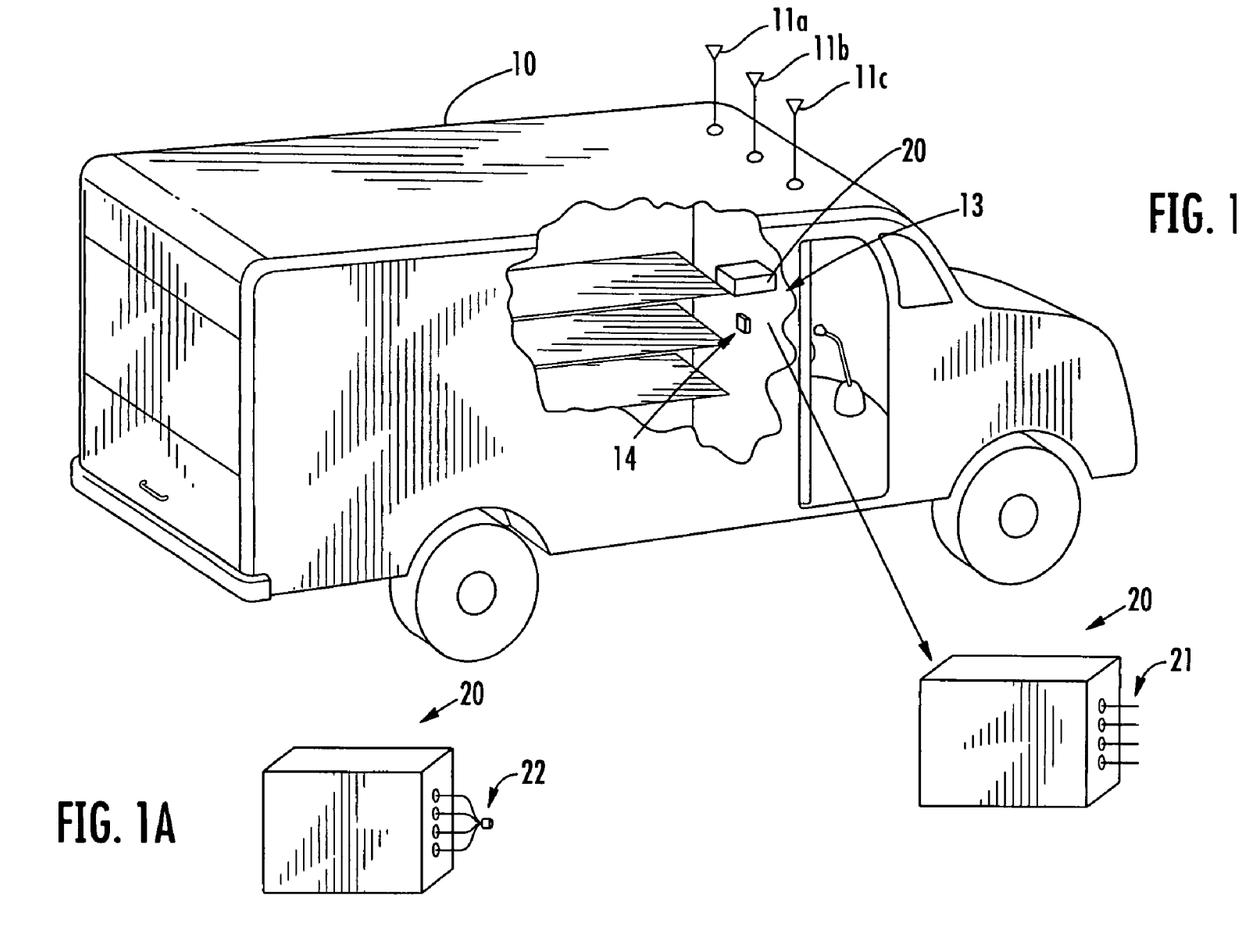
FIG. 1 is a schematic of a vehicle with a signal testing unit mounted to a surface of the vehicle.
FIG. 1A is a schematic of a testing unit according to one embodiment of the invention.

FIG. 1 depicts an embodiment of the mounting assembly described above in which the signal testing unit 20 is mounted adjacent to a wall 13 inside the vehicle 10. In other embodiments, the testing unit 20 can be mounted adjacent to any suitable surface, such as a bulkhead, shelf, roof, floor, or exterior surface of the vehicle, using a bracket. The vehicle 10, which typically is a fleet vehicle, provides connections to a GPS antenna 11a, wireless signal antennas 11b, 11 c, and a power source 14. As shown in FIG. 1, the signal testing unit 20 has separate connectors 21 that connect with the power source 14, a GPS antenna 11a, and wireless signal antennas 11b, 11c. In another embodiment, as shown in FIG. 1A, the signal testing unit 20 includes one connector 22 that provides a connection with the power source 14, the GPS antenna 11a, and the wireless signal antennas 11b, 11c. In yet another embodiment, one or more of the antennas may be internal to the signal testing unit 20 and no connection to an external antenna 11a-c is required. In another embodiment, which is discussed below in relation to FIG. 4, one or more antennas extend from a housing in which the testing unit 20 is mounted. Furthermore, the signal testing unit 20 may contain an internal energy source and not require connection to an external power source 14.

Figure 2:
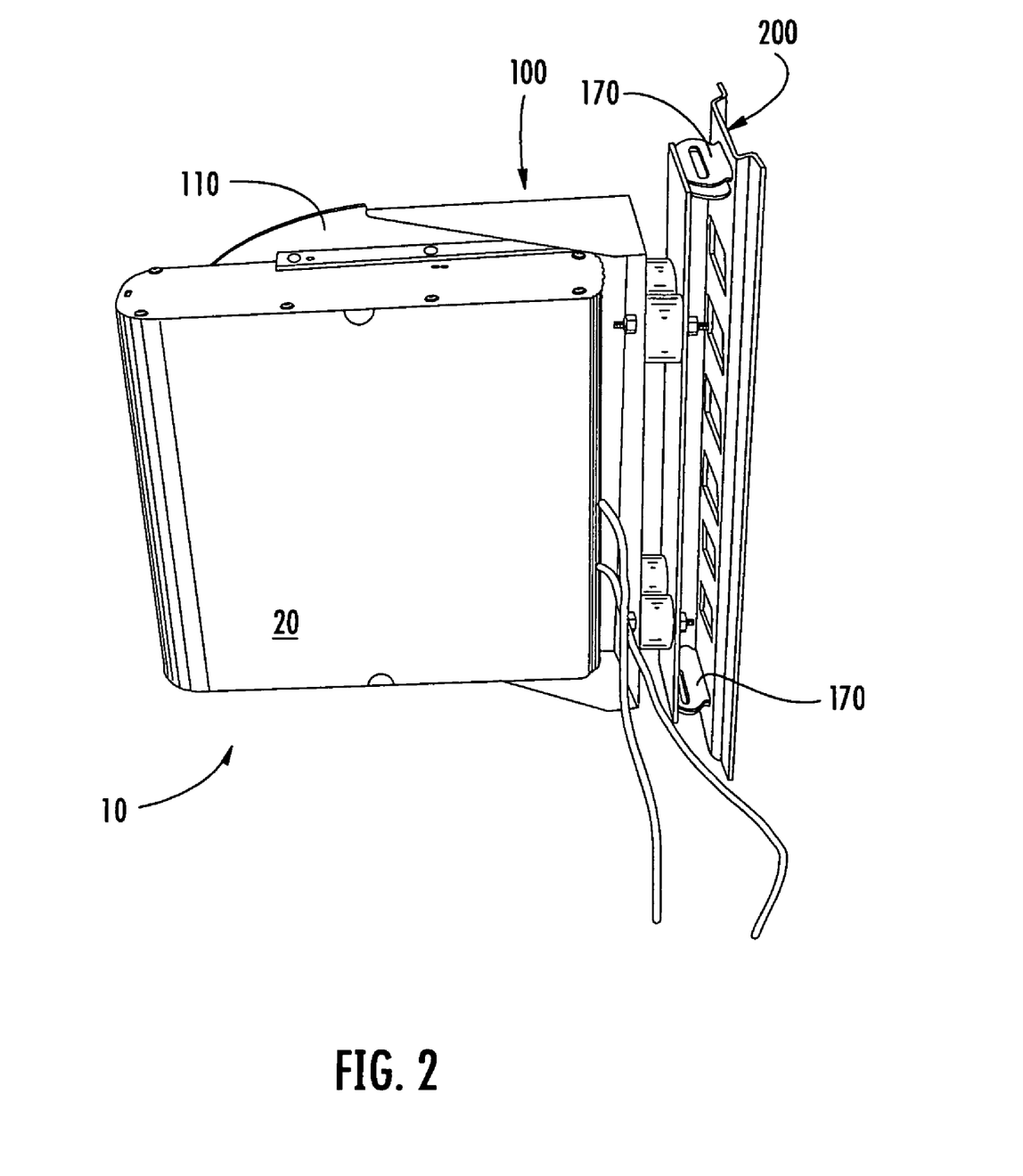
FIG. 2 is an illustration of a mounting assembly according to one embodiment of the invention.

The embodiment illustrated in FIG. 2 shows a mounting assembly 10 that includes a signal testing unit 20, a mounting bracket 100, and a channel plate 200 that can be fastened to a suitable internal or external vehicle surface. The mounting bracket 100 provides a housing 110 for the testing unit 20 to protect it from damage by other objects, a clip 170 for attaching the housing to the channel plate 200, and a shock absorbing material to impede the transfer of vibrational energy from the vehicle to the testing unit 20.

Figure 3:
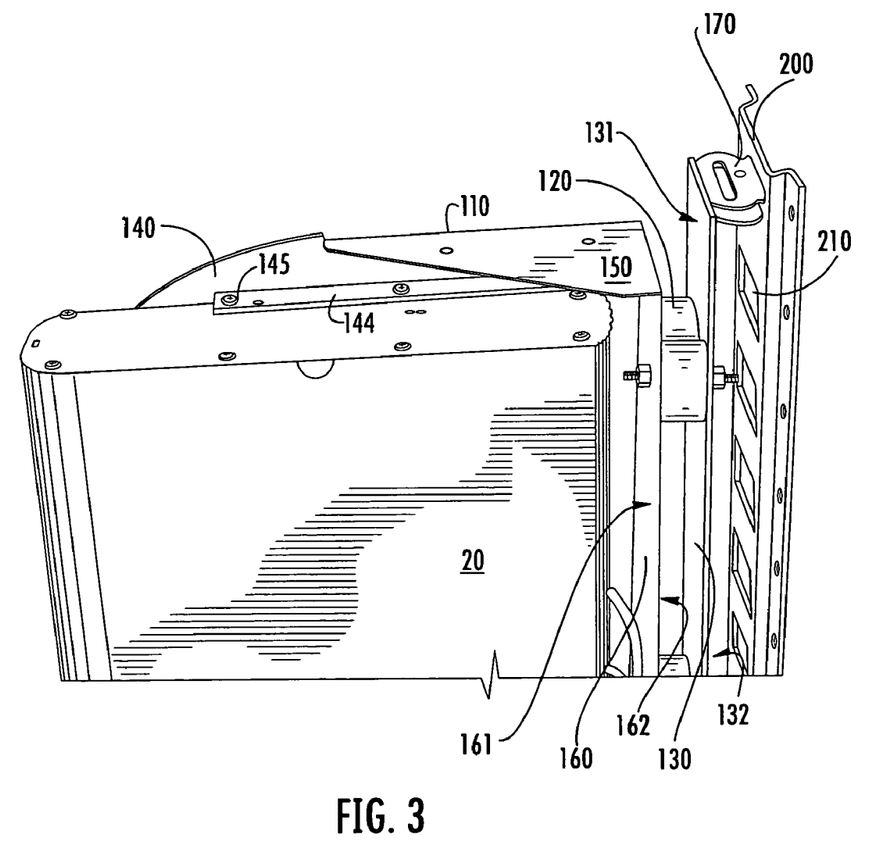
FIG. 3 is an illustration of the mounting assembly in FIG. 2.
Figure 4:
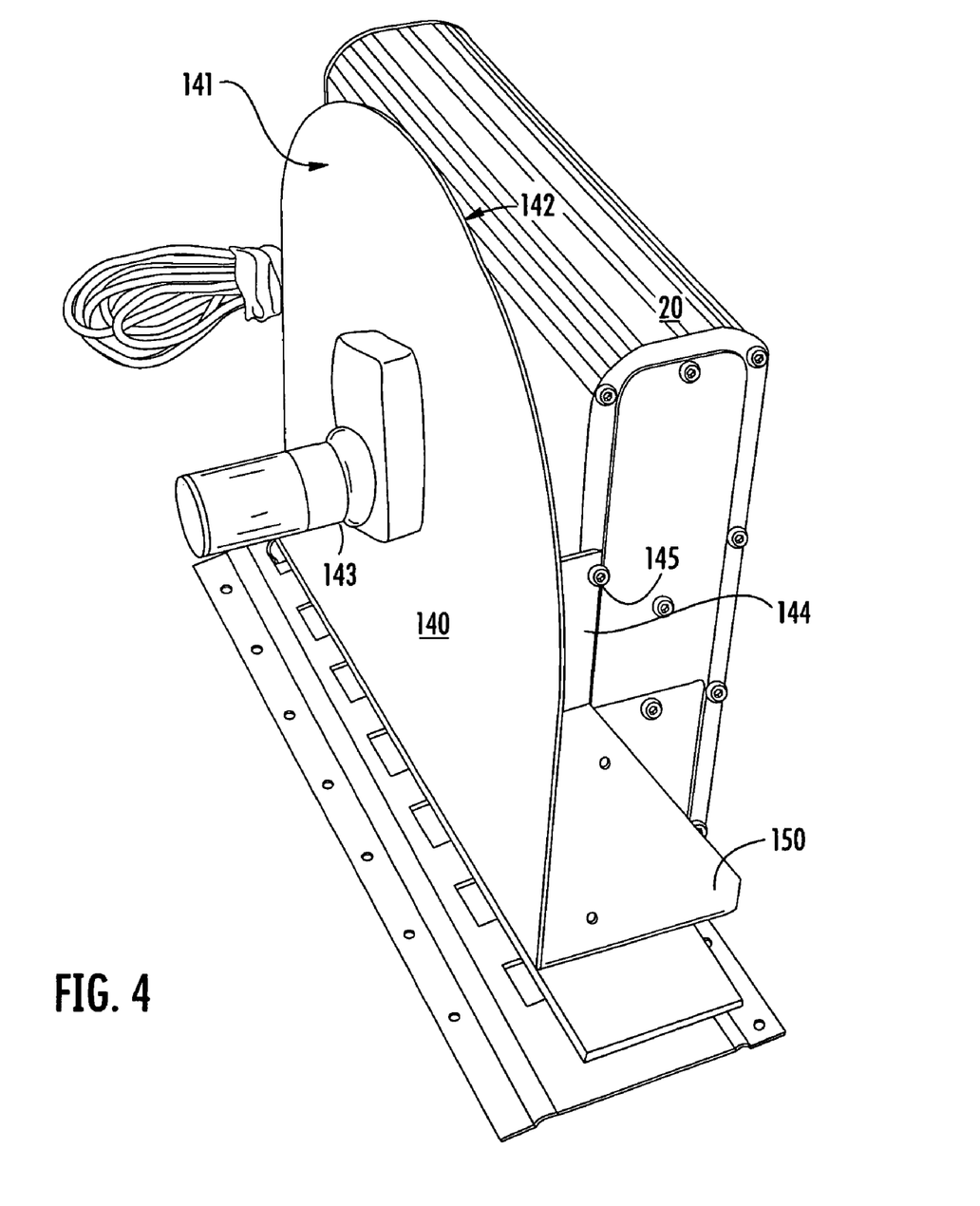
FIG. 4 is a perspective view of the bracket and signal testing unit shown in FIG. 2.

As illustrated in FIGS. 3 and 4, the housing 110 includes a main plate 140, two edge plates 150, and a back plate 160. The main plate 140 is sized to extend past at least three edges of a face of a testing unit that is positioned adjacent to the main plate 140. The main plate 140 serves to provide protection for the face of the testing unit 20 and for at least a portion of other surfaces. In addition, the upper side 141 of the main plate 140 includes a portion for mounting an antenna 143. The antenna 143 extends from the upper side of the main plate and receives radio frequency (RF) signals or GPS signals for transferring to the testing unit 20.

The lower side 142 of the main plate 140 is adjacent to the testing unit 20 and includes two flanges 144 that extend perpendicularly from the main plate 140. Threaded apertures are positioned along each flange 144 such that the apertures align with threaded apertures on two opposing sides of the testing unit 20. Screws 145 are engaged through the threaded apertures and the apertures of the testing unit to hold the testing unit securely to the housing 110. Alternative embodiments may include compression springs, such as leaf springs to hold the testing unit 20 within the housing 110. And, in another embodiment in which the apertures in the flanges do not align with the apertures on the testing unit, screws may be used as set screws to hold the testing unit 20 within the housing 110.

The two edge plates 150 are positioned on opposite edges of the main plate, spaced outwardly from the flanges 144, and extend perpendicularly from the main plate 140. The edge plates 150 provide added strength to the structure of the housing 110 and protection to a portion of two sides of the testing unit 20.

The back plate 160 is attached to the main plate 140 and the edge plates 150 and extends perpendicularly from each of the plates 140, 150. The back plate includes an inner side 161 and an outer side 162. The inner side 161 is adjacent the testing unit 20 when the testing unit 20 is mounted to the housing 110.

Figure 5:
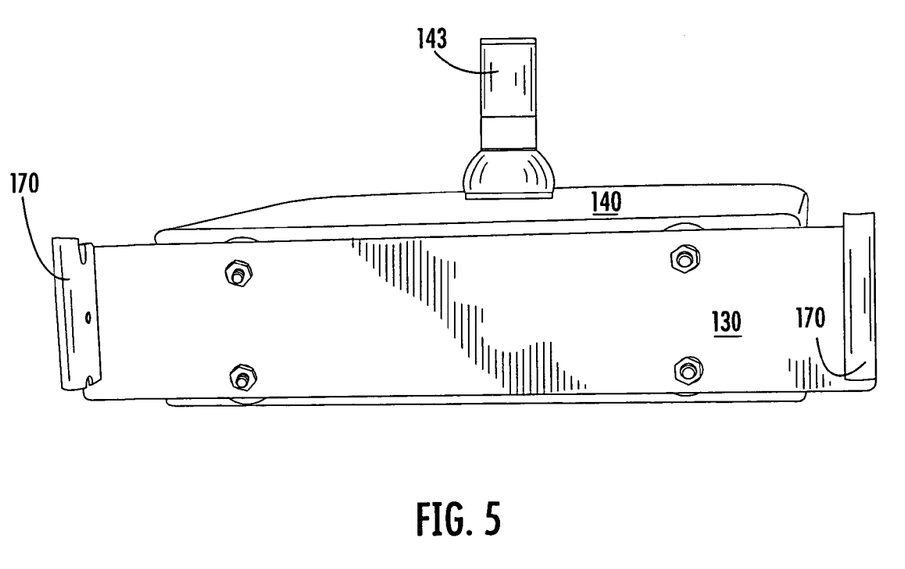
FIG. 5 is a back view of the bracket shown in FIG. 2.

The clips 170 for connecting the housing 110 to the channel plate 200 may be disposed on the back plate 160 or on a clip plate 130. In the embodiment shown in FIG. 3, the clips are mounted to a clip plate 130, and the clip plate 130 includes a housing side 131 and a clip side 132. The housing side 131 is adjacent the housing 110 and the clip side 132 is on the opposite side. As shown in FIG. 5, the clip side 132 includes at least two conventional spring-biased clips 170 that extend perpendicularly to the clip plate 130. Spring clips 170 are each positioned on the clip plate 130 to engage a channel 210 on the channel plate 200.

In a further embodiment, shown in FIGS. 4 and 5, a shock absorbing material is positioned intermediate the outer side 162 of the back plate and the housing side 131 of the clip plate 130. The shock absorbing material absorbs a portion of vibrational energy from the vehicle that would otherwise be transferred to the housing 110 and the testing unit 20. In the embodiment shown in FIG. 3, the shock-absorbing material is a plurality of rubber pads 120 that are bolted intermediate the back plate 160 and the clip plate 130 by engaging a bolt through the clip plate, apertures in the rubber pads 120, and the back plate 160. However, in other embodiments, shock absorbing materials other than rubber, such as a spring, may be used, and other methods of assembling the shock absorbing material are within the scope of the invention.

Figure 6:
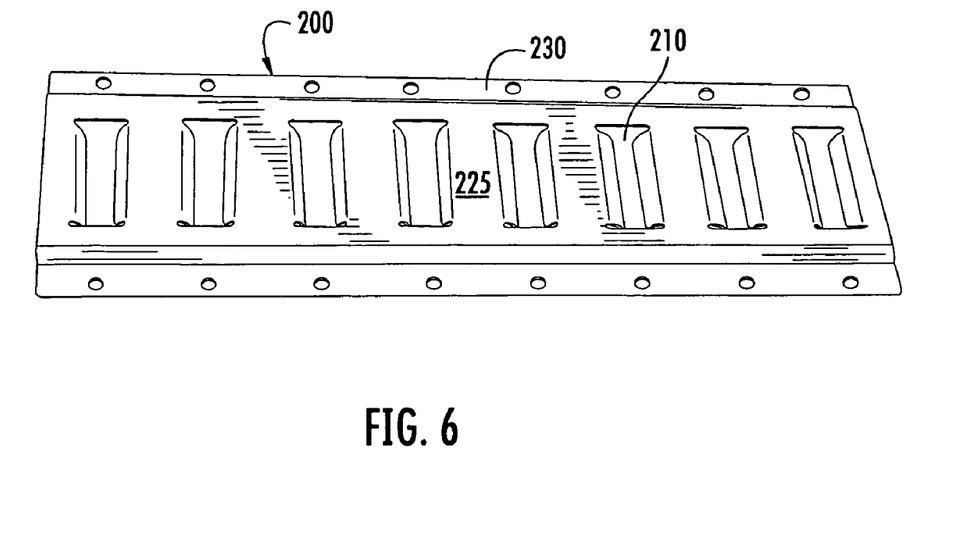
FIG. 6 is a perspective view of the channel plate shown in FIG. 2.

FIG. 6 illustrates an embodiment of the channel plate 200. The channel plate 200 shown is a metal plate that has a raised center span 225 between two generally flat edge rails 230. The edge rails 230 include a plurality of apertures 235 for receiving screws or other fasteners to mount the channel plate 200 to a suitable surface in or on a vehicle. The raised center span 225 includes a plurality of open channels 210 therethrough. The channels 210 are dimensioned to receive a clip 170 or a portion of the clip, as described below. The center span 225 is raised relative to the edge rails 230 in order to allow sufficient clearance for the clips 170 on the bracket 100 to securely engage the channel plate 200.

Figure 7:
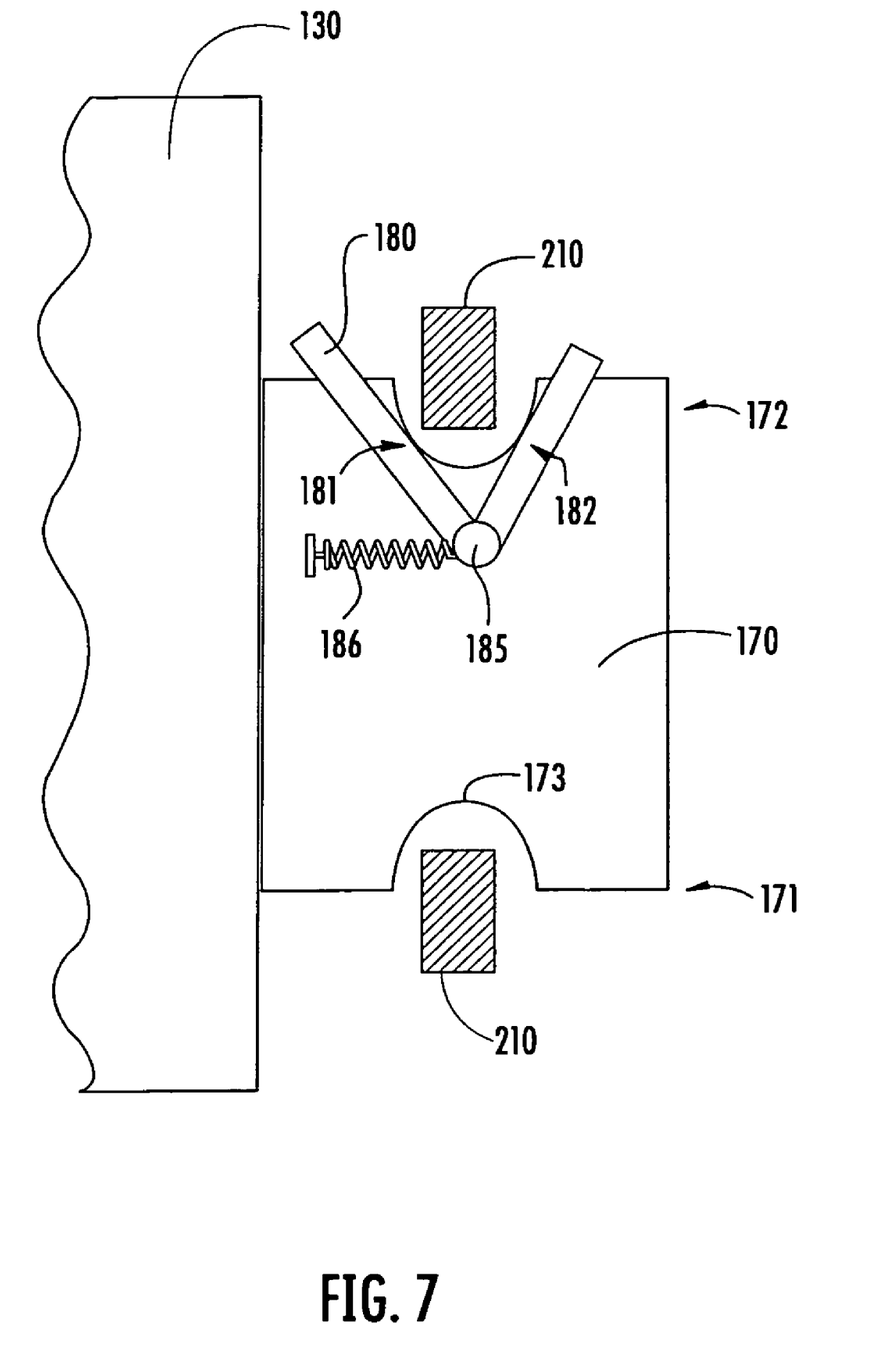
FIG. 7 is a sectional view of a clip and the clip plate shown in FIG. 2.

The clip 170 in the embodiment shown in FIG. 7 includes a first end 171 and a second end 172. The first end 171 includes a U-shaped portion 173 for engaging an edge of a channel 210. The second end 172 includes an L-shaped finger 180 that is pivotally mounted within the clip 170. The L-shaped finger 180 includes a first arm 181 that is substantially parallel with the clip plate 130 when the clip 170 is not engaged into the channel 210 and a second arm 182 that is at an acute angle (less than or equal to 90°) relative to the first arm 181. The pivot point 185 on the L-shaped finger 180 is attached to a spring 186.

To engage the clip 170 into a secure position within the channel 210, the U-shaped portion 173 of the first end 171 is positioned to straddle to one of the flat edge portions 230 within one of the open channels 210. The second end 172 of the clip 170 is pushed towards the flat edge portion 230 on the opposing side of the channel 200. This pushing motion forces the first arm 181 of the L-shaped finger 180 to move towards the housing 110, or away from the channel plate 200. As the first arm 181 is moved backwards relative to the channel plate 200, the second arm 182 is pivoted in an outward direction relative to the clip 170 such that the second arm 182 is adjacent a back side of the channel plate 200 and the first arm 181 is adjacent a front side of the plate 200. In other words, when the L-shaped finger 180 is engaged into the channel 210, the second arm 182 and the first arm 181 straddle an edge of the channel 210. The spring 186 attached to the L-shaped finger's pivot point 185 is engaged and prevented from motion by a spring stop (not shown). The clips hold the unit firmly in place, but can be disengaged by hand.

The embodiments described herein should not be limited to the orientation described. One of ordinary skill in the art would know that the channel plate 200 could be attached to any suitable surface of a vehicle or stationary wall having any orientation. Additionally, the antenna attached to the main plate may be removed when an antenna is internal to the testing unit or is otherwise not needed. The apparatus may be provided, in the alternative, with a separate antenna electrically connected to the testing unit by a cable.

The invention claimed is:

1. A mounting assembly for removably mounting a signal testing unit adjacent to a vehicle surface, the assembly comprising:
   a channel plate having a back side and a front side, the channel plate defining a plurality of channels extending through the back side and the front side; and
   a mounting bracket comprising a housing and one or more clips, each of the one or more clips comprising at least one finger for removably engaging the channel plate,
   wherein:
      each of the one or more clips comprises a first end and a second end, the first end defining a U-shape and being adapted for straddling a first edge of the channel, and the second end defining a U-shape and being adapted for straddling a second edge of the channel,
      each of the one or more clips is adapted for being removably engaged into one of the channels by moving an engaging portion of each finger toward the back side of the channel plate such that the mounting bracket is positioned adjacent the front side of the channel plate, and
      the second end further comprises an L-shaped finger having a first arm and second arm, wherein the second arm is in the engaging portion, the L-shaped finger being pivotally mounted to the second end such that the second arm is positioned adjacent the back of the channel plate and the first arm is positioned adjacent the front of the channel plate when the clip is engaged into the channel.

2. A mounting assembly according to claim 1 wherein the pivot point on the L-shaped finger is spring biased such that the second arm extends from the perimeter of the clip.

3. A mounting assembly according to claim 1 wherein the mounting bracket further comprises a shock absorbing material positioned between each clip and the housing.

4. A mounting assembly according to claim 1 wherein the housing comprises a main plate, a first edge plate, and a second edge plate, the first and second edge plates disposed adjacent respective first and second edges of the main plate, the first and second edges being spaced apart from each other, wherein compression springs are disposed on an inner surface of each said first and second edge plates for securing the testing unit within the housing.

5. A mounting assembly for removably mounting a signal testing unit adjacent to a vehicle surface, the assembly comprising:
   a channel plate having a back side and a front side, the channel plate defining a plurality of channels extending through the back side and the front side; and
   a mounting bracket comprising a housing and one or more clips, each of the one or more clips comprising at least one finger for removably engaging the channel plate,
   wherein:
      each of the one or more clips comprises a first end and a second end, the first end defining a U-shape and being adapted for straddling a first edge of the channel, and the second end defining a U-shape and being adapted for straddling a second edge of the channel,
      the housing comprises a main plate and at least two edge plates disposed adjacent at least two edges of the main plate, the main plate comprising an antenna extending from an outer surface of the main plate, and inner surfaces of the main plate and the two or more edge plates defining a cavity for receiving the testing unit, and
      the housing further comprises two flanges that extend from the inner surface of the main plate and are positioned between the edge plates, the flanges comprising apertures for receiving screws for securing the testing unit within the housing.

6. A mounting assembly for removably mounting a signal testing unit adjacent to a vehicle surface, the assembly comprising:
   a channel plate having a back side and a front side, the channel plate defining a plurality of channels extending through the back side and the front side; and
   a mounting bracket comprising a housing and one or more clips, each of the one or more clips comprising at least one finger for removably engaging the channel plate,
   wherein:
      each of the one or more clips comprises a first end and a second end, the first end defining a U-shape and being adapted for straddling a first edge of the channel, and the second end defining a U-shape and being adapted for straddling a second edge of the channel,
      the housing comprises a main plate and at least two edge plates disposed adjacent at least two edges of the main plate, the main plate comprising an antenna extending from an outer surface of the main plate, and inner surfaces of the main plate and the two or more edge plates defining a cavity for receiving the testing unit, and
      the housing further includes two flanges that extend from the inner surface of the main plate and are positioned between the edge plates, and wherein the testing unit is positioned between the flanges, the flanges including compression springs for securing the testing unit within the housing.

7. A mounting assembly according to claim 6 wherein the housing further comprises a back plate that extends between the main plate and the two edge plates and has an inner side and an outer side, the bracket further including a shock absorbing material mounted between the outer side of the back plate and the one or more clips.

8. A mounting assembly according to claim 7 wherein the bracket further comprises a clip plate onto which the one or more clips are mounted and the shock absorbing material is positioned between the back plate and the clip plate.

* * * * *